United States Patent [19]

Shelby

[11] Patent Number: 5,691,580
[45] Date of Patent: Nov. 25, 1997

[54] BUTTON INTERFACE FOR STATE MACHINE

[76] Inventor: Kevin Alan Shelby, 56 Garfield Pl., Red Bank, N.J. 07701

[21] Appl. No.: 447,328

[22] Filed: May 22, 1995

[51] Int. Cl.[6] .................... H01H 35/00; H01H 9/26
[52] U.S. Cl. .................... 307/119; 307/112; 200/5 R; 200/6 R; 326/105
[58] Field of Search .................... 307/112, 113, 307/116, 119; 200/4, 5 A, 5 R, 6 R, 16 R, 69, 339, 557, 512, 517; 326/105, 106, 107, 108

[56] References Cited

U.S. PATENT DOCUMENTS

| | | | |
|---|---|---|---|
| 3,772,484 | 11/1973 | Roeser | 200/4 |
| 4,525,607 | 6/1985 | Senoh | 200/16 R |
| 4,748,348 | 5/1988 | Thong | 326/105 |
| 5,130,704 | 7/1992 | Ogawa et al. | 340/803 |
| 5,283,401 | 2/1994 | Schmucker | 200/6 A |
| 5,378,862 | 1/1995 | Tasaka et al. | 200/6 A |
| 5,508,479 | 4/1996 | Schooley | 200/5 R |

*Primary Examiner*—William M. Shoop, Jr.
*Assistant Examiner*—Jonathan S. Kaplan

[57] ABSTRACT

A button interface for a state machine provides three signals, X, Y, or X and Y. The state machine further detects a single contact, a double contact, or a persistent contact to provide a matrix of nine separate states which control player functions. The cover of the button interface has two degrees of freedom, rotation and depression, which are achieved by various embodiments of leaf and coil springs.

16 Claims, 6 Drawing Sheets

BUTTON INTERFACE FOR STATE MACHINE

BACKGROUND OF THE INVENTION

1. Cross Reference to Related Application

This application is related to another U.S. patent application, Ser. No. 08/447,336 entitled "Remote Control Unit For Audio Home System" having a filing date of May 22, 1995, that application having a common inventor and assignee and being incorporated herein by reference.

2. Field of the Invention

This invention relates to an a button interface for a state machine, and more particularly to one which controls the retrieval of digital data such as music.

3. Description of Related Art

Portable audio players which employ magnetic tape or optical compact disks are commonplace since advances in storage technology have increased both the reproduction quality and the storage capacity. Further advances in storage technology will provide semiconductor Read-Only-Memory (ROM) which have a 20 Megabyte capacity on a chip which is about an inch square. This memory, plus interface circuitry, will be contained within a low-cost, rugged package which is approximately 2.5×1.125×0.25 inches.

With compression algorithms, this package will provide the same quality sound as the bulkier five inch optical disk. Furthermore, there are no moving parts to wear out and no need for a constant linear velocity on every part of the recording track. This will improve reliability and reduce the size of playback equipment so that it will conveniently fit within the palm of a hand.

Many selections will be contained on the chip which will store about an hour of music, and it would be desirable to retrieve directly particular selections anywhere from the memory. To do this, each chip is encoded with a header which contains global information about the selections on the chip and the encoding algorithm.

The package is designed to be inserted into a palm sized player which contains the power, amplifiers, and control circuitry which includes selector switches for the user and a state machine which interprets the selections made and which drives a display. These selector switches are the only moving parts in the player, so they should not occupy excessive volume compared to the memory and amplifiers. Since each memory cell is individually addressable and is readable over a parallel data bus, an ability to search the whole memory is available and places an additional requirement upon the selector switches for increased functionality. Some typical functions which the player provides are: play/pause, volume increase/decrease, next selection forward/reverse, skip selection forward/reverse, power on/off, and chip eject.

Accordingly, there is a need for a small switch which is inexpensive for a mass market, and one which provides for the selection of many states using a minimum number of mechanical parts.

SUMMARY OF THE INVENTION

The present invention relates to a button interface for a state machine, and more particularly to one which controls the retrieval of digital data such as music. In one embodiment, two separated contacts and conduction biasing means in the form of a contact spring are supported on a base. The contact spring is a leaf spring and is held at a predetermined potential. Gaps separate the contact spring from the two contacts. Extremities of the contact spring are located above the two contacts and are attached to a cover which may be moved in two degrees of freedom. Finger pressure upon the cover can rotate the cover to deflect one side of the contact spring to touch one contact or the other, if the pressure is applied to one of the extremities of the cover; or contact may be made to both contacts by applying pressure in the middle of the cover thereby depressing it. The signals generated are conducted to logic means in the form of an electronic interface comprised of AND gates whose output enters a state machine which recognizes a first contact, a second contact, or both contacts simultaneously, each for a single pulse, for a double pulse, or for a persistent contact.

In another embodiment of the invention, biasing means separate a conductive member having at least one contact on its lower surface opposite to first and second contacts on a base member. Biasing means in the form of a coil spring may be compressed to make both contacts, or it may rotate with the conductive member to make contact with either the first or the second contact. The signals are connected via AND gates to a state machine as above.

In yet another embodiment, biasing means are employed to separate the conductive member from the first and second contacts on the base member. The biasing means may be either two coil springs or a leaf spring. The signals are connected via AND gates to a state machine as above.

In still another embodiment of the invention, biasing means support the conductive member in addition to a pin which is mounted to a fulcrum which in turn is supported by a spring attached to the base member. The base also guides the movement of the fulcrum, centered between the springs, when an external force upon the conductive member is applied to make both the first and the second contacts. When a single contact is desired, the conductive member rotates about the pin. The signals are connected via AND gates to a state machine as above.

An advantage of the invention is that a single, inexpensive button can provide three signals to a state machine, which can sense a single contact, a double contact, or a persistent contact to form a matrix of nine states.

These and other features and advantages of the invention will be better understood with consideration of the following detailed description of the preferred embodiments taken in conjunction with the accompanying drawings.

BRIEF DESCRIPTION OF THE DRAWINGS

The drawings are not to scale.

DETAILED DESCRIPTION OF THE PREFERRED EMBODIMENTS

Figure 1:
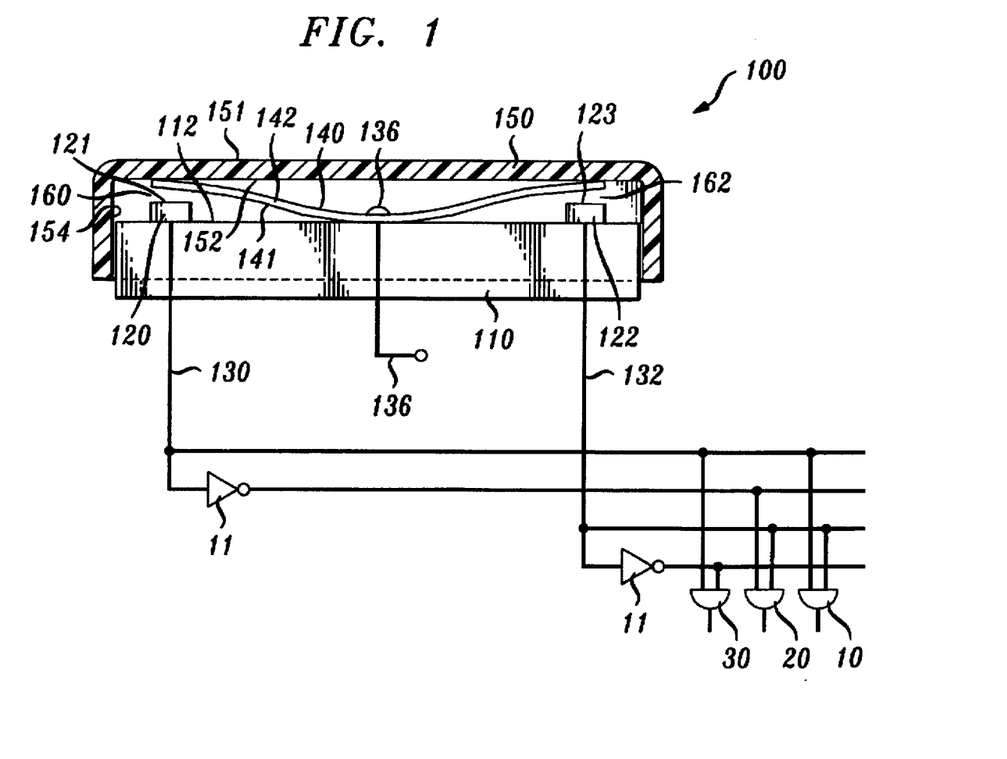
FIG. 1 shows sectional side and end views on one embodiment of the invention.
Figure 1A:
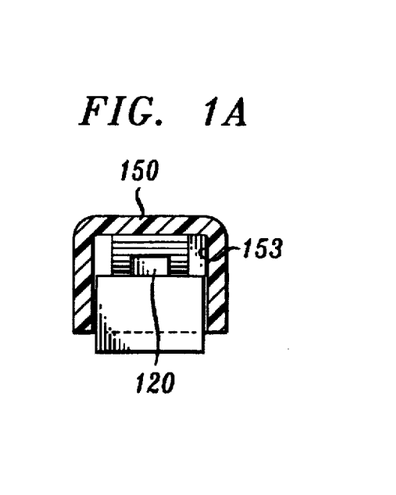

Referring now to FIG. 1, there is shown apparatus 100 which is a button interface for a state machine in which an electrical insulating base member 110 having an upper surface 112 upon which is supported a first, or X, contact 120, a second, or Y, contact 122, and conductive biasing means 140. The X and Y contacts have upper surfaces 121 and 123, respectively, and the contact spring has an upper surface 142 and a lower surface 141. The biasing means conducts electricity and has the shape of a shallow arc, the extremities of which support cover 150. The lower surface of the biasing means, or contact spring, is mounted to the base at a point between the X and Y contacts where electrical lead 136 is connected to the contact spring. X lead 130 and Y lead 132 are connected to the X contact and the Y contact, respectively, through the base. Cover 150 is an electric insulator having an outer surface 151, an inner surface 152, two inner side surfaces 153, and two inner end surfaces 154. The inner surface 151 is bonded to the upper surface of the contact spring at its extremities, and the inner side surfaces fit around and partially encloses the base, and they are also spaced to slide over the base. Gaps 160 and 162 are defined by the upper surfaces of the X and Y contacts, respectively, and the lower surface of the spring. The gaps may be closed, and electrical contact made between the contact spring and the X and Y contacts, in any of the following three states. First, gap 150 may be closed by the application of a downward force upon the outer surface 151 of cover 150 in the vicinity of the X contact. This causes the left side of contact spring 140 (in FIG. 1) to deflect downward until lower surface 141 touches upper surface 121 of the X contact. Second, a similar force may be applied above the Y contact, causing the right side of the contact spring to deflect and touch upper surface 123 of the Y contact. Finally, a downward force may be applied between the X and Y contacts, causing the cover to move downward to deflect both the left and right sides of the contact spring until lower surface 141 makes contact with both upper surface 121 and upper surface 123. In this manner the potential of electric lead 136 may be communicated to the X lead, the Y lead, or both the X lead and the Y lead. Contact spring 140 permits cover 150 to move in two degrees of freedom: rocking left or right when a force is applied over a contact, or up and down when a force is applied between the contacts. A person applying a force to change the state of the machine will experience a different "feel" when energizing both contacts because both sides of contact spring 140 need to be deflected. This simple button interface may define nine states of the machine by having the machine recognize a single contact, two contacts in succession, or a continuing contact on each of the X, Y, or the X and Y leads.

Coupled to the X and Y outputs of the button is logic means in the form of an electrical interface which interprets the condition of the button and generates a separate output signal (on a different output line) depending on the present state of the button contacts. In accordance with one preferred embodiment of the electrical interface, each of the X and Y outputs is coupled to a series of AND gates through either inverted or non-inverted outputs, the inversion being performed by inverters 11. The inputs to the AND gates are configured so that any possible condition which is entered into on the button will give a high output (logic "1") at one of the AND gates. For example, three different states can be achieved from the various conditions of the button presses, (more states can actually be achieved by monitoring the duration of the button presses, as will be explained later). These conditions are as follows: both X and Y depressed, X depressed and not Y, and Y depressed and not X. When either X, Y, or X and Y contacts are depressed, a positive voltage is generated from the corresponding lead. Logic gate 10 has non-inverted inputs connected to it from each of these leads, thus an applicable positive voltage on each of the inputs to AND gate 10 produces a logic "1" at its output terminal. Each of the other AND gates will generate a logic "0" from the outputs thereof, since the inputs to each of these gates include one inverted input which produces a "0" to prevent the logic gate from being turned on.

Each of the second and third AND gates 20 and 30, respectively, has one inverted and one non-inverted input connected thereto. Thus, when one or the other input is depressed and the other not, a positive output, or logic "1" will appear at the output thereof. For example, AND gate 30 includes a non-inverted input from the lead Y and an inverted input from the lead X. Thus, when the Y contact is depressed and the X contact is not, a positive voltage is produced at both inputs of the gate 20 (i.e., one positive voltage from the non-inverted lead and one positive voltage from the low voltage of lead X which is then inverted to appear positive). This in turn produces a logic "1" at the output of the logic gate 30.

In a similar fashion, when the X lead is activated and the Y is not, a logic "1" will be produced at the output of the first AND gate 30. Thus, depending on the depressed state of the button, a different output will be activated for each different activation state. Also it can be seen that if none of the contacts are depressed, then no activation will be generated from any of the AND gates, since positive voltages will not appear at both inputs of any gate. Of course, it will be understood that other logic means may be used to achieve similar results, the shown embodiment, however, comprising AND gates is preferred because of its simplicity.

Figure 7:
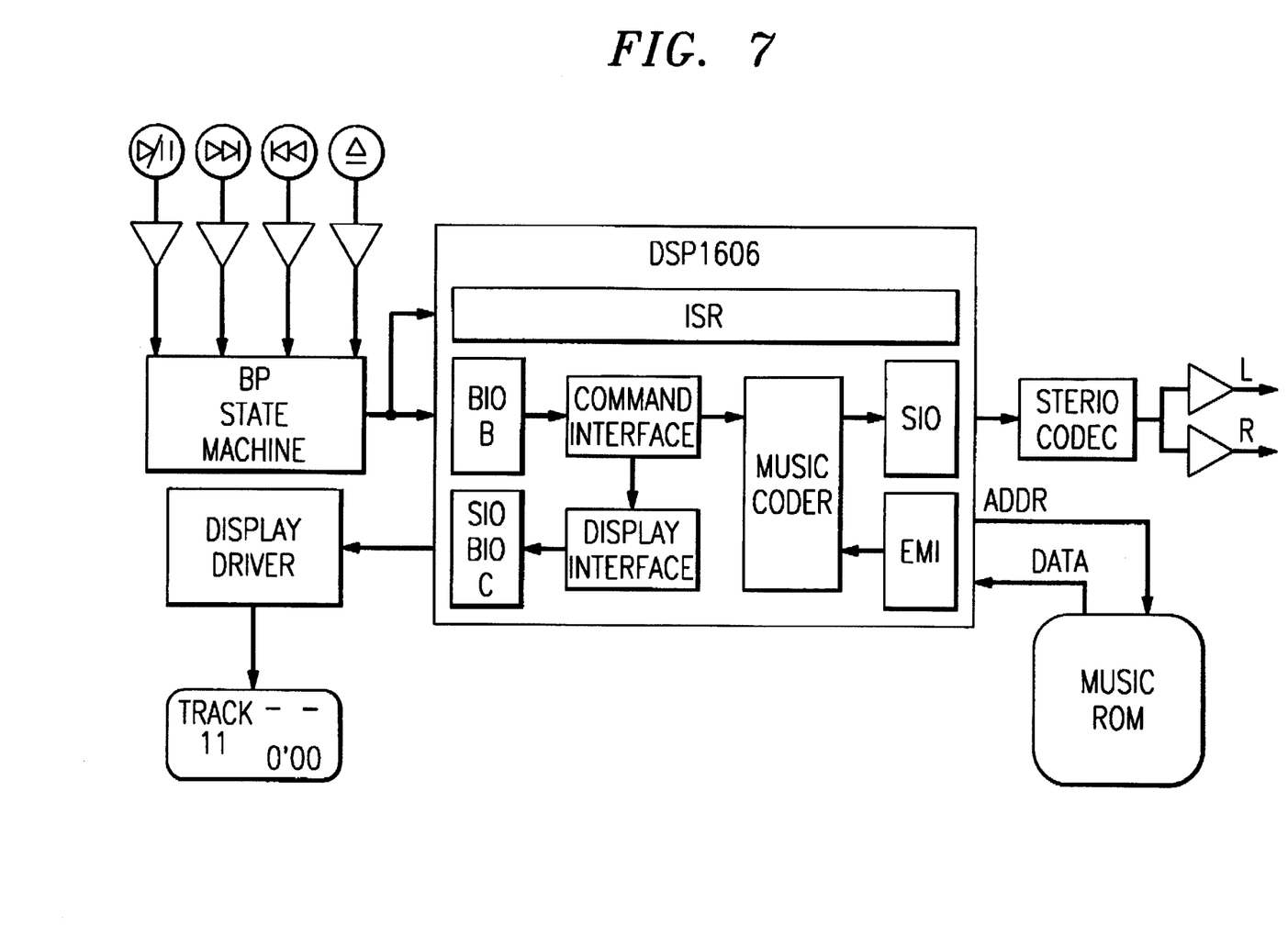
FIG. 7 shows a block diagram of the relationship of the state machine to the button interface and a digital signal processor.

FIG. 7 shows the state machine coupled to the button interface in order to interpret the signal produced from the electronic logic. The state machine associates the output of each of the three AND gates to represent a separate command to the processor. The state machine also monitors the duration of the button presses with timing means and associates a different command for each type of button press, for example, short click, double click, and persistent press. A timing device within the state machine includes a predetermined threshold, wherein a depression (and therefore signal generated to the state machine) which is in excess of the predetermined limit, for example, two seconds, will be interpreted as a persistent depression. Short clicks under the predetermined time threshold can be counted if received within a predetermined time window, in order to indicate other states.

Figure 5:
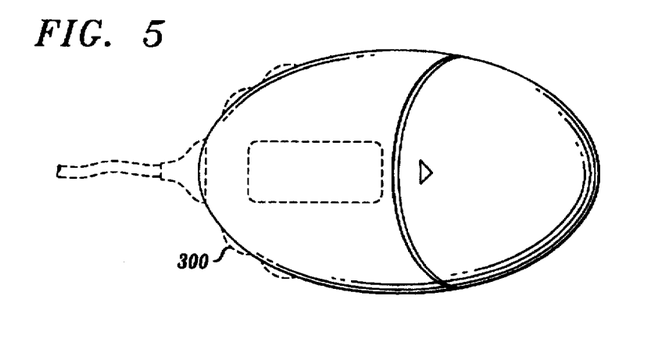
FIG. 5 shows a hand held player with an embodiment of the invention contained therein.

The state machine provides separate commands to the digital signal processor. In terms of the portable audio players which is a preferred application of the present invention, the button depressions and state machine conditions will correspond to various search and play commands. For example, a preferred embodiment of the portable audio player will contain two sets of separate button interfaces (FIG. 5). In this case the first button controls the play and search commands. The search and play commands correspond to single clicks of each of the button leads as follows: X and Y together=play and pause in alternate sequence (a toggle switch); X and not Y=up scan at normal speed; y and not X=down scan at normal speed. Utilizing the scan commands the memory is sequenced to find different placements within the pre-recorded music as for example music recorded on cassette tapes. The X and Y leads are also monitored for persistent presses by the state machine. In this case persistent presses of one lead and not the other correspond to fast increment commands such as fast forward and fast reverse, which are similar to VCR functions.

The second button interface on FIG. 5 includes other functions pertinent to music play. For example, one preferred embodiment has a double press of both X and Y leads corresponding to the On/Off functions. X and not Y, and Y and not X correspond to the increase volume and decrease volume, respectively. The volume buttons would most likely not require monitoring for persistent button presses since a user will normally prefer volume changes to be gradual. Fast volume increments could also be implemented, however, with persistent button presses as could other frequently used functions. Other designated functions include play/pause. So the state machine receives the user requests from the logic interface and interprets these commands, wherein predetermined commands are transmitted to the processor for execution.

Figure 2:
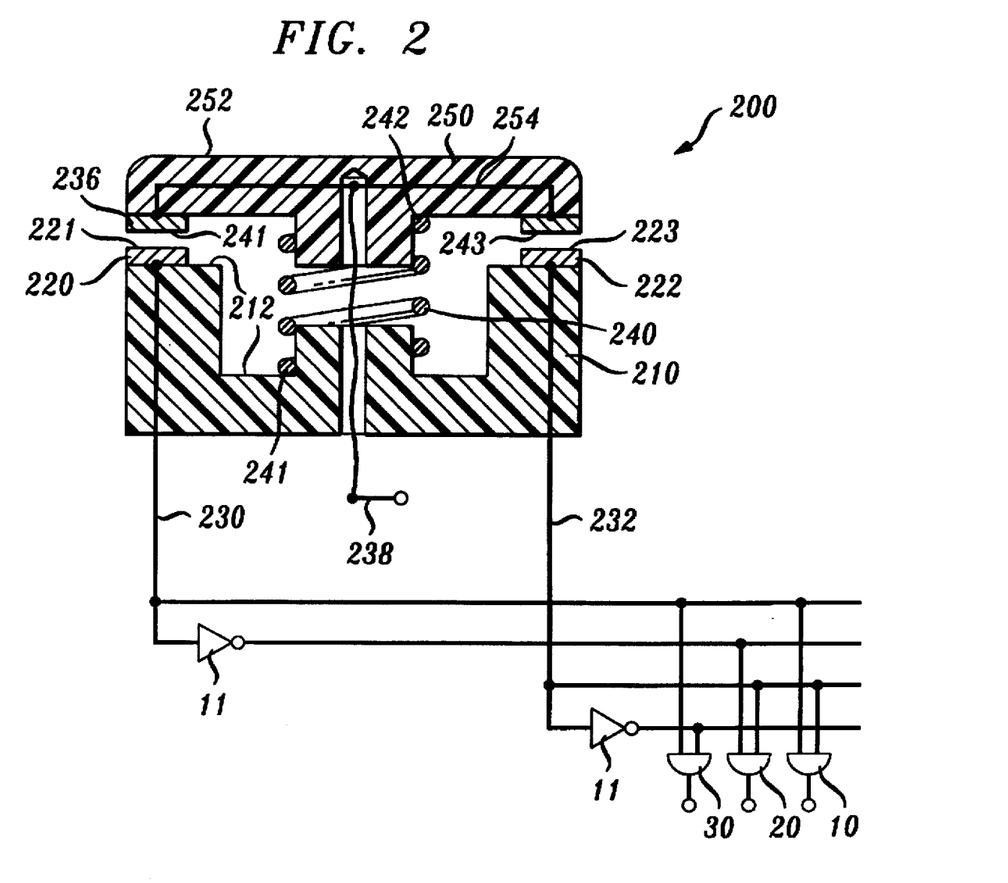
FIG. 2 shows a side sectional view of another embodiment of the invention.

Referring now to FIG. 2, there is shown apparatus 200, another embodiment of the invention, which is a button interface for a state machine in which an electrical insulating base member 210 having an upper surface 212 upon which is supported an X contact 220, a Y contact 222, and spring 240. The X and Y contacts have upper surfaces 221 and 223, respectively, and the spring has a first end 241 in contact with the base and a second end 242 which is attached to conducting member 250. The spring can deflect in two degrees of freedom, up and down, and second end 242 may tilt left or right depending upon the point of application of a force upon upper surface 252 of the rocker. X lead 230 and Y lead 232 are connected to the X contact and the Y contact, respectively, through the base. Conductive member 250 has a lower surface 254 upon which is mounted at least one positive contact 236 which is connected to electrical lead 238, which penetrates the base and conductive member. Gaps and are defined by the upper surfaces 221 and 223 of the X and Y contacts, respectively, and the lower surface of the positive contact. The gaps may be closed, and electrical contact made between the positive contact and the X and Y contacts, in any of the following three states. First, one gap may be closed by the application of a downward force upon the upper surface 251 of the conductive member in the vicinity of the X contact. This causes the left side of conductive member to rotate downward until lower surface 241 touches upper surface 221 of the X contact. Second, a similar force may be applied above the Y contact, causing the right side of the conductive member to rotate downward and touch upper surface 223 of the Y contact. Finally, a downward force may be applied between the X and Y contacts, causing the conductive member to move downward to compress spring 240 until both the X and Y contacts touch lower surfaces 241 and 242. In this manner the potential of electric lead 286 may be communicated to the X lead, the Y lead, or both the X lead and the Y lead. As before, the X and Y leads are coupled to an electronic interface comprising first, second and third AND gates 10, 20 and 30, respectively. The description of their operation to provide input to the state machine recited for FIG. 1 is incorporated here.

Figure 3A:
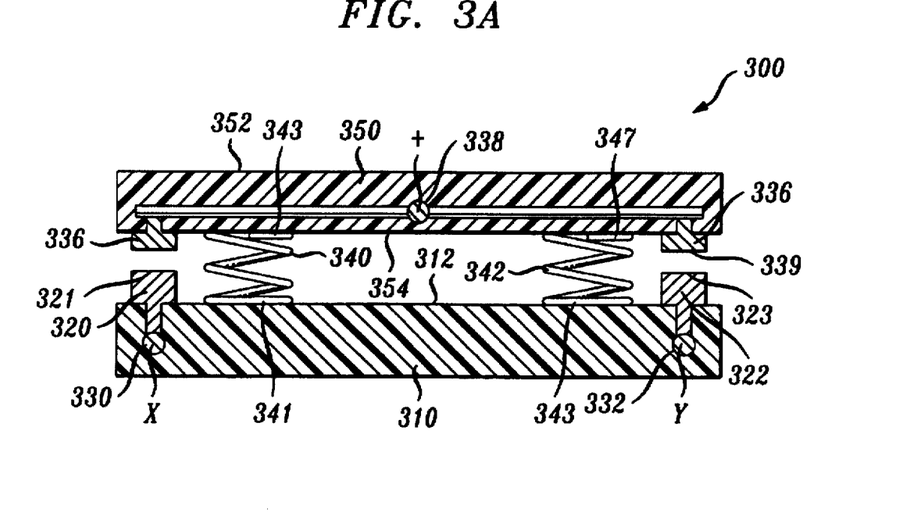
FIG. 3 shows a side sectional view of yet another embodiment of the invention.
Figure 3B:
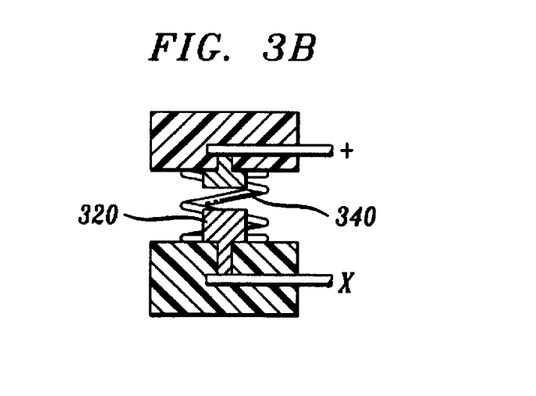
Figure 3C:
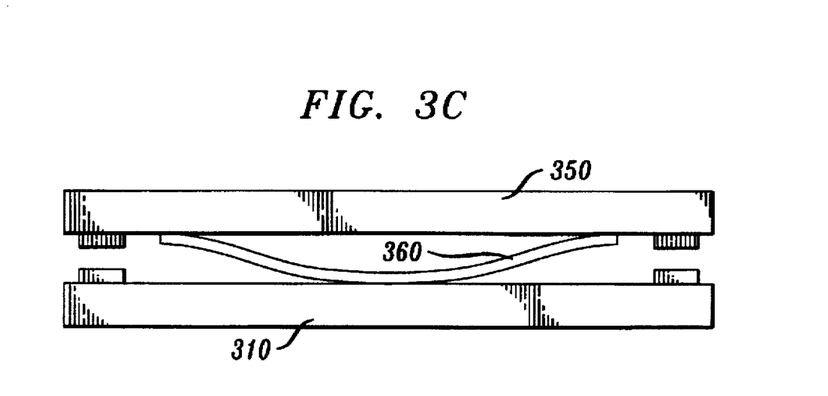

Referring now to FIG. 3, there is shown apparatus 300, yet another embodiment of the invention, which is a button interface for a state machine in which an electrical insulating base member 310 having an upper surface 312 upon which is supported an X contact 320, a Y contact 322, and biasing means 340 and 342, each having a first ends 341 and 343, respectively, which contact the base, and second ends 345 and 347, respectively. The X and Y contacts have upper surfaces 321 and 323, respectively. Second ends 345 and 347 are attached to and support rocker 350. The conductive member may tilt left or right depending upon the point of application of a force upon upper surface 352 of it. X lead 330 and Y lead 332 are connected to the X contact and the Y contact, respectively, through the base. Conductive member 350 has a lower surface 354 upon which is mounted at least one positive contact 336 which is connected to electrical lead 338. Gaps and are defined by the upper surfaces 321 and 323 of the X and Y contacts, respectively, and the lower surface 339 of the positive contact. The gaps may be closed, and electrical contact made between the positive contact and the X and Y contacts, in any of the following three states. First, one gap may be closed by the application of a downward force upon the upper surface 351 of the rocker in the vicinity of the X contact. This causes the left side of the conductive member to rotate downward until lower surface 339 touches upper surface 321 of the X contact. Second, a similar force may be applied above the Y contact, causing the right side of the rocker to rotate downward and touch upper surface 323 of the Y contact. Finally, a downward force may be applied between the X and Y contacts, causing the conductive member to move downward to compress both biasing means until both the X and Y contacts touch positive contact 336. In this manner the potential of electric lead 338 may be communicated to the X lead, the Y lead, or both the X lead and the Y lead. As before, the X and Y leads are coupled to an electronic interface comprising first, second, and third AND gates 10, 20 and 30, respectively. The description of their operation to provide input to the state machine recited for FIG. 1 is incorporated here.

The biasing means may be coil springs as shown in the upper portion of FIG. 3, or it may be at least one leaf spring as shown in the lower portion of FIG. 3.

Figure 4:
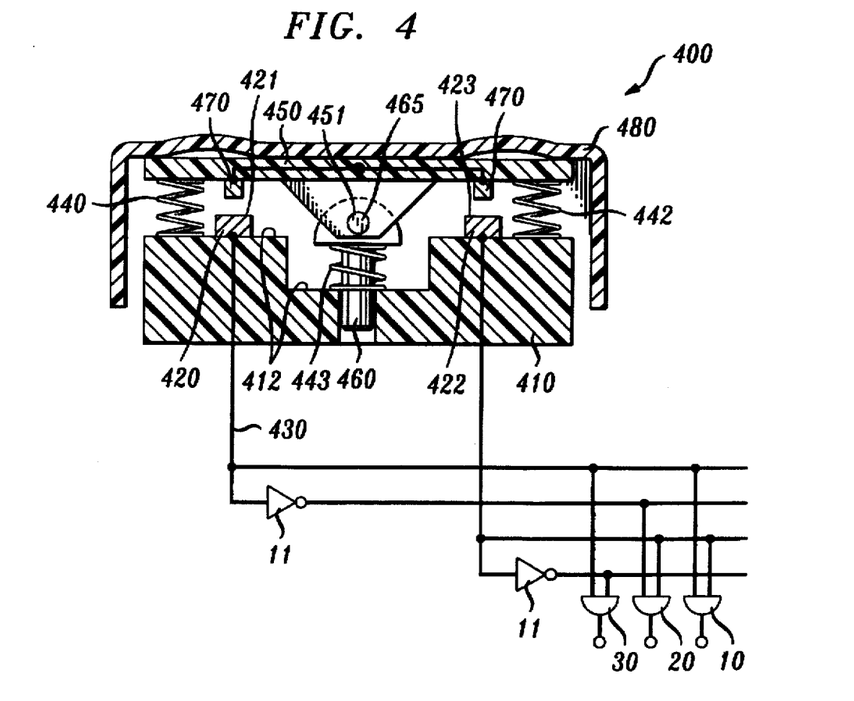
FIG. 4 shows a side sectional view of still another embodiment of the invention.
Figure 4A:
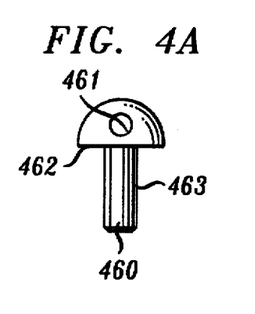
Figure 4B:
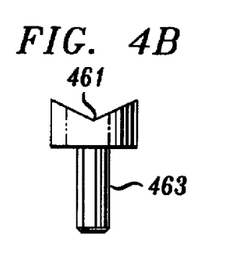
Figure 4C:
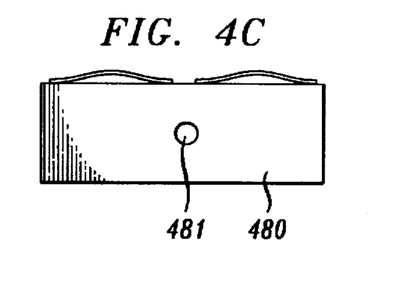
Figure 4D:
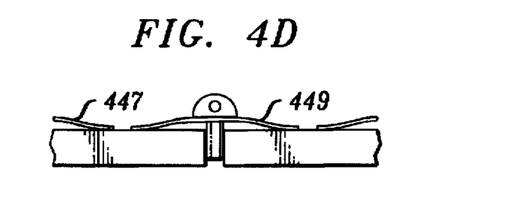

Referring now to FIG. 4, there is shown apparatus 400, still another embodiment of the invention, which is a button interface for a state machine adapted to control the retrieval of digital data in which an electrical insulating base member 410, having an upper surface 412 upon which is supported an X contact 420, a Y contact 422, and biasing means 440 and 442, the centerline of each being separated by a first distance from the other; each having first ends 441 and 443, respectively, which contact the base, and second ends 445 and 447, respectively which support a conductive member 450. The X and Y contacts have upper surfaces 421 and 423, respectively. Conductive member 450 defines a hole 451.

Upper surface 412 of base 410 also supports a fulcrum biasing means 443, located between the biasing means, the first end of which is in contact with upper surface 412 and a second end of which supports a fulcrum 460, having a support 461, and a first surface 462 which is supported by the second end of the fulcrum biasing means. A second surface 463, makes sliding contact with the base. A pin 465 penetrates hole 451 of the rocker and contacts the support of the fulcrum. A positive contact 470, is mounted to the lower surface of the conductive member, and is located above the X contact and the Y contact, separated from them by a first gap, and a second gap. Contact may be established between the positive contact and the X contact by the application of a force to the upper surface of the rocker near the centerline of one rocker biasing means. In this case the conductive member rotates downward on the left side of the apparatus in FIG. 4. Contact may also be established between the positive contact and the Y contact by the application of a force to the upper surface of the conductive member near the centerline of the other biasing means causing a rotation downward on the right side of the apparatus. Finally, contact may be established between the positive contact and both the X contact and the Y contact by the application of a force to the upper surface of the biasing means between the centerlines of the two biasing means. In this case, both biasing means and the fulcrum biasing means compress and the conductive member descends until the positive contact touches both the X and Y contacts. Electrical leads 430 and 432 connected to the X contact and the Y contact, respectively, are also connected to the state machine and whatever the potential the positive contact has is directed into the state machine.

The biasing means may be coil springs as shown in the upper part of FIG. 4, or they may be leaf springs 447 and 449 as shown in the lower part of the figure. Similarly, the fulcrum biasing means may be a coil spring or a leaf spring. The support in the fulcrum may be a hole or a notch which supports pin 465.

A compliant cover 480 has a receptacle 481 which is adapted to fit over the rocker and base. The receptacle may capture the end of pin 465 so that the cover is held in place.

As before, the X and Y leads are coupled to an electronic interface comprising first, second, and third AND gates 10, 20 and 30, respectively. The description of their operation to provide input to the state machine recited for FIG. 1 is incorporated here.

Figure 6A:
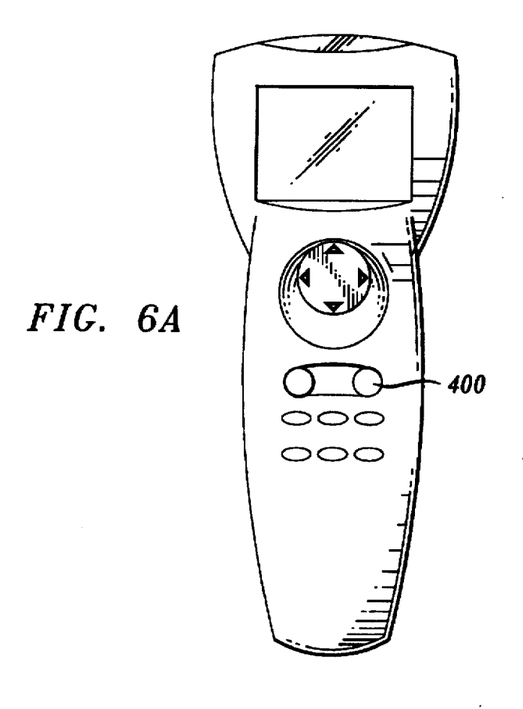
FIG. 6 shows a remote control unit containing an embodiment of the invention.
Figure 6B:
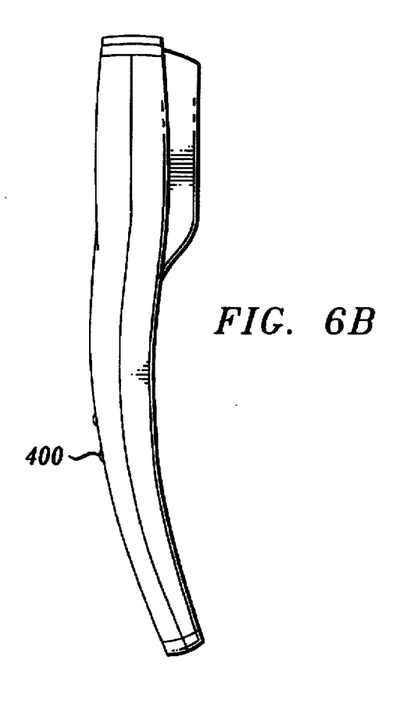
Figure 6C:
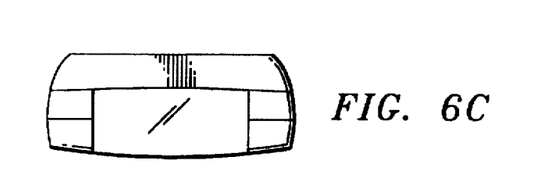

FIG. 5 and FIG. 6 show any of the aforementioned embodiments of the invention contained within a hand-held player unit and a remote control unit, respectively. For example, two buttons 300 are shown in FIG. 5 which provide all the power, volume and search capabilities previously described.

FIG. 7 is a block diagram showing the button inputs to the state machine and its outputs to a digital signal processor which controls the player functions.

Changes and modifications in the specifically described embodiments can be carried out without departing from the scope of the invention. In particular, the relative locations of the springs with relation to the contacts may be reversed in FIG. 2 and FIG. 3, and leaf springs and coil springs may be used in the same embodiment.

I claim:

1. A switch apparatus, comprising:

a first electrical contact;

a second electrical contact;

a cover element suspended over said first electrical contact and said second electrical contact, wherein said cover element has a first region disposed above said first electrical contact, a second region disposed above said second electrical contact, and a middle region disposed between said first region and said second region; and a third electrical contact disposed below said cover element, wherein a predetermined tactile force applied to said first region of said cover element causes an electrical connection between said first electrical contact and said third electrical contact, a predetermined tactile force applied to said second region of said cover element causes an electrical connection between said second electrical contact and said third electrical contact, and a predetermined tactile force applied to said middle region of said cover element causes an electrical connection between said third electrical contact and both said first electrical contact and said second electrical contact.

2. The apparatus of claim 1 further comprising a logic circuit connected to said first electrical contact and said second electrical contact, said logic circuit comprising a first, a second, and a third AND gate, wherein said first AND gate receives non-inverted signals from said first electrical contact and said second electrical contact, the second AND gate receives an inverted signal from the first electrical contact and a non-inverted signal from the second electrical contact, and the third AND gate receives a non-inverted signal from the first electrical contact and an inverted signal from the second electrical contact.

3. The apparatus of claim 2 further comprising a state machine coupled to said logic circuit, said state machine being operative to interpret signals from said logic circuit as specific user input commands.

4. The apparatus of claim 3 wherein the state machine includes timing means tracking depressions over a predetermined threshold, wherein said state machine distinguishes persistent depressions from intermittent depressions.

5. The apparatus according to claim 1, wherein said third electrical contact is supported by said cover element.

6. The apparatus of claim 1, wherein said cover element is suspended over said first electrical contact and said second electrical contact by at least one spring element.

7. The apparatus according to claim 6, wherein said spring element is a leaf spring that extends above said first electrical contact and said second electrical contact, wherein said leaf spring supports said cover element and serves as said third electrical contact.

8. The apparatus according to claim 6, wherein said first electrical contact and said second electrical contact are supported on a common base and said at least one spring element is disposed in between said base and said cover element.

9. The apparatus of claim 8 wherein the biasing means is a coil spring that is interspersed between the base member and the cover element.

10. The apparatus according to claim 6, wherein said at least one spring element is configured to include a single coil spring that is disposed below said middle region of said cover element.

11. The apparatus according to claim 6, further including a guide pin extending from said cover element, wherein said guide pin passes into a guide bore in said base.

12. The apparatus according to claim 11, further including a guide pin spring for biasing said guide pin away from said guide bore.

13. The apparatus according to claim 12, wherein said guide pin spring is a coil spring that surrounds said guide spring.

14. The apparatus according to claim 12, wherein said guide pin spring is a leaf spring.

15. The apparatus according to claim 11, wherein said cover element is pivotably connected to said guide pin.

16. The apparatus of claim 6 wherein said at least one spring element is configured to contain a pair of spaced apart coil springs, wherein one of said coil springs is positioned near said first electrical contact and one of said coil springs is positioned near said second electrical contact.

\* \* \* \* \*